2,716,361
Patented Aug. 30, 1955

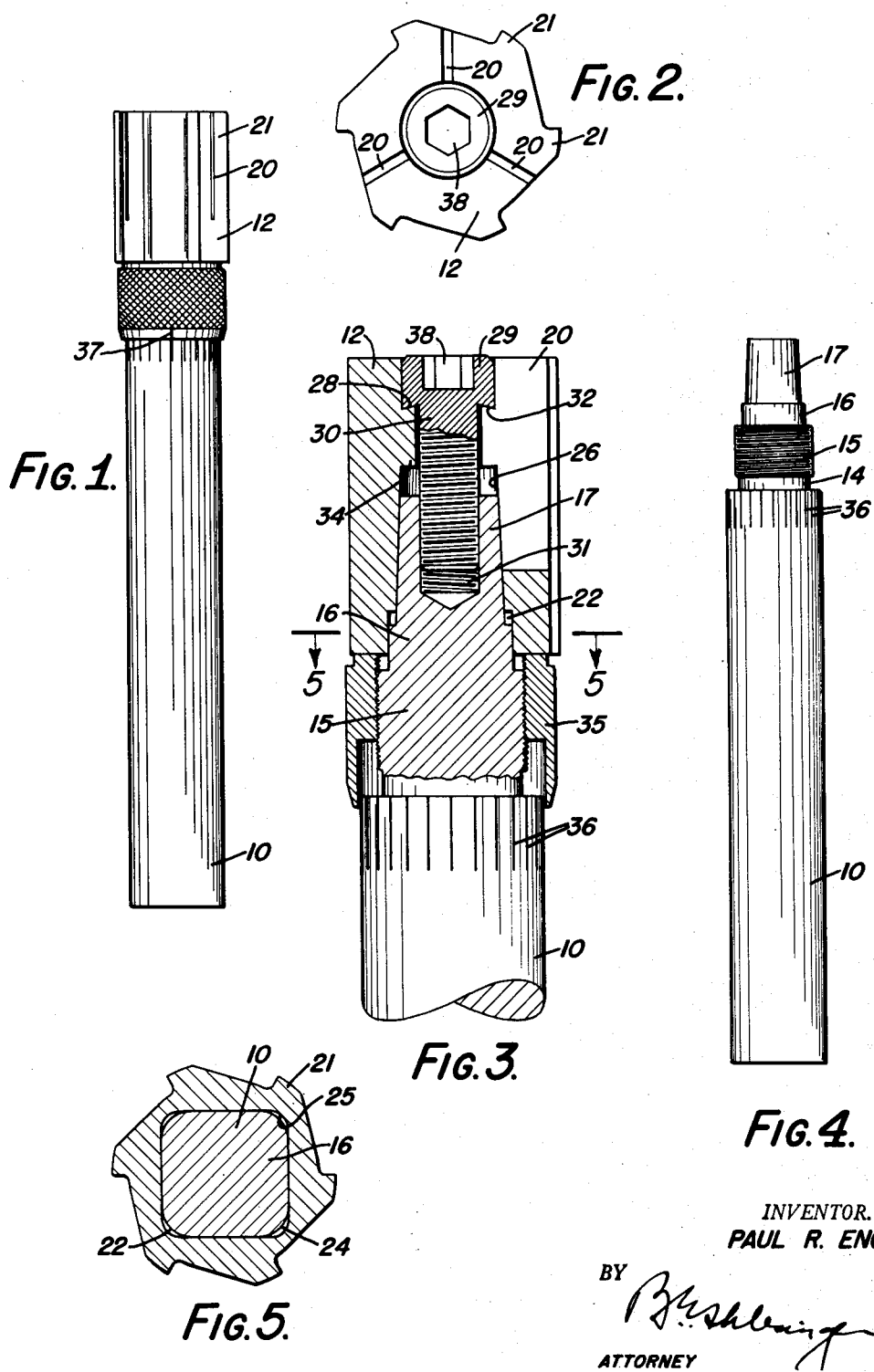
Aug. 30, 1955     P. R. ENGEL     2,716,361
EXPANSIBLE REAMER
Filed April 6, 1951
INVENTOR.
PAUL R. ENGEL

United States Patent Office

2,716,361

EXPANSIBLE REAMER

Paul R. Engel, Irondequoit, N. Y., assignor to Carl Wirth & Son, Inc., Rochester, N. Y., a corporation of New York Application April 6, 1951, Serial No. 219,719

4 Claims. (Cl. 77—76)

The invention relates to expansible reamers.

As heretofore constructed expansible reamers have not been entirely satisfactory because the cutting blades or teeth have lacked support at their outer, projecting ends when the reamer was expanded.

One object of the present invention is to provide an expansible reamer which is so constructed that the cutting teeth or blades of the reamer will be properly supported in all positions of expansion of the reamer.

Another object of the invention is to provide an expansible reamer with an improved drive between the arbor or mandrel and the reamer head.

A further object of the invention is to provide an expansible reamer which is simple in construction and which can be made at a reasonable cost and which will have a comparatively long useful life.

Still another object of the invention is to provide an expansible reamer in which the desired diameter of reamer may be adjusted very quickly and accurately, and may definitely and accurately be maintained.

Other objects of the invention will be apparent hereinafter from the specification and from the recital of the appended claims.

In the drawing:

Fig. 1 is a side elevation of an expansible reamer and support constructed according to one embodiment of this invention;

Fig. 2 is an end view of the reamer on a considerably enlarged scale;

Fig. 3 is a part side elevation, part axial section of the reamer on the scale of Fig. 2;

Fig. 4 is a side elevation approximately on the scale of Fig. 1 of the arbor or mandrel on which the reamer head is mounted; and Fig. 5 is a section on the line 5—5 of Fig. 3 looking in the direction of the arrows.

Referring now to the drawing by numerals of reference, 10 denotes the arbor or mandrel which is adapted to carry the reamer head and which is adapted to be mounted in the chuck of a drill, lathe or other machine tool on which the reamer is to be used. The main body portion of the arbor 10 is cylindrical. At its projecting end it is formed first with a portion of reduced diameter 14 which is externally threaded as denoted at 15. Beyond the threaded portion 15 the mandrel or arbor 10 is further reduced in diameter and has a driving portion 16 which is generally rectangular in shape; and beyond this the arbor is shaped to have the tapered conical portion 17.

The reamer head 12 itself may be of conventional construction. It is provided with longitudinal flutes 20 to permit of expansion and contraction. It is formed on its periphery with a plurality of cutting teeth 21 which are sharpened and relieved in conventional manner.

The reamer head 12 has a recess 22 in its rear end which is generally square in cross section and which is adapted to receive the correspondingly generally square-shaped driving portion 16 of the arbor 10. The corners of the driving portion 16 are rounded as denoted at 24, and the corners of the recess 22 are rounded as denoted at 25 so as to permit ready assembly of the reamer head on the arbor 10, but the sides of the polygonal driving portion 16 and of the recess 22 closely fit one another so that there is good driving engagement between the arbor 10 and the reamer body.

The reamer head 12 is further provided with a tapered bore 26 which is adapted to receive and fit over the tapered nose portion 17 of the arbor 10. There is a slight difference in the angle of taper of the nose portion 17 and of the taper of the bore 26, perhaps half a degree or so, so that there will be proper contact between the nose portion 17 and the reamer head 12 in all positions of expansion of the reamer head.

The front or projecting end of the reamer head 12 is conically counter-bored as denoted at 28. This counterbore is adapted to receive the head 29 of a cap screw 30 which threads into the tapped hole 31 in the nose 17 of the mandrel 10. The head 29 of the screw 30 is internally tapered or undercut on its inside, as denoted at 32. This internal taper or undercut corresponds to the taper of the bottom of the counterbore 28 so that the head 29 of the screw 30 has frictional engagement at all times with the front faces of the tangs 34 which are formed by the flutes 20 between the counterbore 28 and the bore 26 of the reamer head. The head 29 of the screw 30 acts, therefore, as an outboard support for the cutting teeth of the reamer head. The screw 30 may be a hollow head screw and have a polygonal recess as denoted at 38 to receive a suitable adjusting wrench.

When the reamer head is positioned on the arbor 10, the inside face of the reamer head is seated against a knurled nut 35 which threads onto the threaded portion 15 of the arbor 10. The arbor may be graduated as denoted at 36; and the knurled nut may be provided with an index line 37 to read against these graduations, thereby to permit accurate adjustment of the diameter of the reamer.

The nut 35 and the headed screw 30 serve to securely hold the reamer head between them in all positions of radial expansion of the reamer. As the nut 35 is threaded inwardly on the shank portion 15 of the arbor 10 the screw 30 is threaded inwardly in the tapped hole 31 to follow the nut up and maintain its function as an outboard support for the cutting teeth of the reamer. Likewise, should it be desired to adjust the reamer in the opposite direction, the nut 35 can be threaded outwardly on the portion 15 of the shank 10 to follow up the outward adjustment of the screw 30. In this way the reamer head and its cutting teeth can be securely held in any position of the adjustment of the reamer whether the reamer be expanded for a particular diameter of hole or to compensate for wear and reduction in height of the cutting teeth. Thus a cut may be obtained with a reamer built according to the present invention in all positions of adjustment of the reamer, which is free of chatter; and thereby the reamer will have a longer life. The polygonal shaped drive between the arbor and the reamer head is a distinct improvement over the driving key employed in conventional reamers and also adds materially to the life of the reamer. While the driving portion 16 is here shown as approximately square in shape, it will be understood that it may be of any other polygonal shape and that the recess 22 in the reamer head will be correspondingly shaped accordingly.

While a specific embodiment of the invention has been illustrated, then, it will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A reamer comprising a cutting head, an arbor on which said cutting head is mounted, and means for securing said cutting head on said arbor, said cutting head having a plurality of cutting teeth formed on its periphery and having a bore, a forward part of which is conical and the rear part of which is polygonal in cross-section and having a plurality of axial slots which extend part-way of the length of the cutter head and from the periphery of the cutting head into said bore, said arbor having a front, a conical portion to fit into the conical portion of said bore and having a rearward portion which is polygonal in cross section to engage in the polygonal portion of said bore to drive said cutting head from said arbor, a collar member rotatably mounted on said arbor and axially adjustable thereon and against which the rear end of said cutting head seats, and means adjustably secured to said arbor and engaging said cutting head at its front end and cooperating with said collar member to adjust said cutting head axially on said arbor to expand and contract said cutting head.

2. A reamer comprising a cutting head, an arbor on which said cutting head is mounted, said cutting head having a plurality of cutting teeth formed on its periphery and having a bore, a forward part of which is conical and the rear part of which is polygonal in shape, said cutting head having a plurality of axial slots which extend part-way of the length of the cutter head and from the periphery of the cutting head into said bore, and having a counterbore in its front end whose bottom face is convex, said arbor having a front conical portion to fit into the conical portion of the bore of said cutting head and having a rearward portion which is polygonal in cross section to engage in the polygonal portion of said bore to drive said cutting head from said arbor, a collar threaded on said arbor and adjustable axially thereon and against which said cutting head abuts, and a headed screw threaded axially into the front end of said arbor and having a concave, undercut rear face engaging directly the convex face of said counterbore.

3. A reamer comprising a cutting head, an arbor on which said cutting head is mounted, said cutting head having a plurality of cutting teeth formed on its periphery and having a bore, a forward part of which is conical and the rear part of which is polygonal in cross-section, said cutting head having a plurality of axial slots which extend part-way of the length of the cutter head and from the periphery of the cutting head into said bore, and having a counterbore in its front end whose bottom face is convex, said arbor having a front conical portion to fit into the conical portion of the bore of said cutting head and having a rearward portion which is polygonal in cross section to engage in the polygonal portion of said bore to drive said cutting head from said arbor, a knurled nut threaded on said arbor and adjustable axially thereon and against which the rear face of said cutting head abuts, and a headed screw threaded axially into the front end of said arbor and having a concave, undercut rear face engaging directly the convex face of said counterbore, said knurled nut and arbor having cooperating graduations for determining the adjustment of said nut.

4. A reamer comprising a cutting head, and an arbor on which said cutting head is mounted, said cutting head having a plurality of cutting teeth formed on its periphery and having a bore at least the rear part of which is conical and having a counterbore in its forward end, said cutting head having a plurality of slots which extend parallel to the axis thereof from the forward end to a point spaced from the rearward end and inwardly from the periphery to merge into said bore to define a plurality of separate tangs, said arbor having a front conical part to fit into the conical part of said bore, a collar rotatably mounted on said arbor and adjustable in an axial direction and upon which the rear end of said cutting head seats, a member threaded for axial adjustment into the forward end of said arbor having a head the under side of which seats on the bottom face of said counterbore, said collar and member when adjusted axially in a direction toward the arbor causing a spreading of the tangs by reason of the interfitting relationship of said conical parts, the bottom face of said counterbore being convex and the under side of said head being concave and approximately complementary to the bottom face of the counterbore to form a surface which resists any tendency of the tangs to spread beyond the position for which they are set by said collar and member, and means connecting the arbor and said cutting head for maintaining them in driving relation.

References Cited in the file of this patent
UNITED STATES PATENTS

| 245,023 | Sisson | Aug. 2, 1881 |
| 1,031,030 | Turney | July 2, 1912 |
| 2,439,968 | Fear | Apr. 20, 1948 |